United States Patent
Valiveti et al.

(10) Patent No.: US 11,675,941 B2
(45) Date of Patent: Jun. 13, 2023

(54) MODELING FLUID FLOW IN A WELLBORE FOR HYDRAULIC FRACTURING PRESSURE DETERMINATION

(71) Applicant: ExxonMobil Technology and Engineering Company, Spring, TX (US)

(72) Inventors: Dakshina M. Valiveti, The Woodlands, TX (US); Ting Song, Tomball, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 534 days.

(21) Appl. No.: 16/849,196

(22) Filed: Apr. 15, 2020

(65) Prior Publication Data
US 2020/0380186 A1 Dec. 3, 2020

Related U.S. Application Data

(60) Provisional application No. 62/855,065, filed on May 31, 2019.

(51) Int. Cl.
*G06F 30/28* (2020.01)
*E21B 43/11* (2006.01)
(Continued)

(52) U.S. Cl.
CPC .............. *G06F 30/28* (2020.01); *E21B 43/11* (2013.01); *E21B 43/267* (2013.01); *G06F 2113/08* (2020.01)

(58) Field of Classification Search
CPC ...... G06F 30/28; G06F 2113/08; E21B 43/11; E21B 43/267; E21B 2200/20; E21B 43/26
See application file for complete search history.

(56) References Cited

U.S. PATENT DOCUMENTS 9,305,121 B2 4/2016 Yao et al.
9,322,259 B2 4/2016 Zhen-Zhong et al.
(Continued)

FOREIGN PATENT DOCUMENTS

WO WO-2015117118 A1 * 8/2015 ......... E21B 41/0092
WO 20160175844 11/2016

OTHER PUBLICATIONS

Gongbo Long et al., "Modeling of Perforation Erosion for Hydraulic Fracturing Applications," SPE-174959-MS pp. 1-14 (Year: 2015).*

(Continued)

*Primary Examiner* — Steven W Crabb
(74) *Attorney, Agent, or Firm* — ExxonMobil Technology and Engineering Company—Law Department

(57) ABSTRACT

A method for modeling fluid flow in a wellbore is provided. Hydraulic fracturing is an effective technique to improve well productivity by forming high permeable pathways for hydrocarbons to flow from the rock formation to the wellbore. Fluid flow for hydraulic fracturing is modeled using separated flow components, including a wellbore component (modeling the wellbore(s)), a perforation component (modeling the perforations(s)), a fracture component (modeling the fracture(s)) and a rock component (modeling the rock). Each respective component may be selected independently from a plurality of available components. Further, the respective components may be coupled to one another only at their interfaces, such as at a wellbore-perforation interface, a perforation-fracture interface, and a fracture-rock interface, for continuity of fluid kinematics and properties (such as pressure and density). In this way, the modeling of the subsurface may be tailored to the respective components in order to effectively predict the fracturing treatment.

21 Claims, 6 Drawing Sheets

(51) Int. Cl.
E21B 43/267 (2006.01)
G06F 113/08 (2020.01)

(56) References Cited

U.S. PATENT DOCUMENTS

| | | | |
|---|---|---|---|
| 9,677,393 | B2 | 6/2017 | Morris |
| 2014/0222392 | A1 | 8/2014 | Johnson et al. |
| 2014/0305638 | A1 | 10/2014 | Wu et al. |
| 2015/0041120 | A1 | 2/2015 | Gumarov et al. |
| 2016/0265331 | A1 | 9/2016 | Weng et al. |
| 2016/0341850 | A1 | 11/2016 | Lin et al. |
| 2016/0357883 | A1 | 12/2016 | Weng et al. |
| 2019/0145233 | A1* | 5/2019 | Karale .................... E21B 43/12 702/6 |
| 2019/0242233 | A1* | 8/2019 | Le Calvez .............. E21B 43/26 |

OTHER PUBLICATIONS

Gongbo Long et al., The Effects of Perforation Erosion on Practical Hydraulic-Fracturing Applications, SPE Journal, 2017, vol. 22, No. 2, pp. 645-659.

* cited by examiner

MODELING FLUID FLOW IN A WELLBORE FOR HYDRAULIC FRACTURING PRESSURE DETERMINATION

CROSS REFERENCE TO RELATED APPLICATION

This application claims the benefit of U.S. Application No. 62/855,065 filed May 31, 2019, the entirety of which is incorporated by reference herein.

FIELD OF THE INVENTION

The present invention relates to a method and system for analyzing and modeling hydraulic fracturing. More specifically, the present invention relates to modeling fluid flow using separated flow components for hydraulic fracturing pressure determination.

BACKGROUND

Hydraulic fracturing has been widely used as an effective technique to improve well productivity by forming high permeable pathways for hydrocarbons to flow from the rock formation to the wellbore. The process of hydraulic fracturing involves pumping down fluids at a prescribed flow rate through the wellbore/casing and into the formation through perforations. When the fluid pressure exceeds the rock breakdown pressure, the fluid pressure creates a fracture in the formation. Proppants, such as sand, are pumped with fracturing fluid to keep the fracture open after release of pumping pressure.

Numerical methods have been used to model fluid flow and rock properties in order to estimate and/or predict the effectiveness of a fracturing treatment. For example, U.S. Pat. No. 9,305,121, incorporated by reference in its entirety, describes methods for modeling fractures in quasi-brittle materials using a unified creep-plasticity representation. However, there still remains a need for improved methods for modeling and predicting fluid pressure in fracture(s) in order to assist in successful hydraulic fracturing treatments.

Additional background references may include U.S. Pat. Nos. 9,322,259 and 9,677,393; U.S. Patent Application Publication Nos. 2014/0305638, 2015/0041120, 2016/0265331, and 2016/0357883; and PCT Publication No. WO 2016/175844; and Non-Patent Literature, Gongbo Long et al., *The Effects of Perforation Erosion on Practical Hydraulic-Fracturing Applications*, SPE Journal, 22(2) (2017).

SUMMARY

In one implementation, a method for modeling fluid flow in a drilling and completions procedure from a surface to a subsurface fracture is disclosed. The method includes: modeling, using the at least one computer, a perforation section of a subsurface associated with one or more perforations using a perforation component; modeling, using at least one computer, at least one of a wellbore section or a fracture section using a wellbore component or a fracture component, respectively, the wellbore section of the subsurface associated with one or more wellbores, the fracture section of the subsurface associated with one or more fractures; and determining, using the at least one computer, at least one aspect of fluid flow using the perforation component and at least one of the wellbore component or the fracture component.

In another aspect, a method for dynamically modeling fluid flow in a drilling and completions procedure from a surface to a subsurface fracture, the method comprising: modeling, using at least one computer, a first section of a subsurface using a first section component for a first stage of the drilling and completions procedure; modeling, using the at least one computer, a second section of the subsurface using a second section component for the first stage of the drilling and completions procedure, wherein the first section component is independent of the second section component; determining, using the at least one computer, at least one aspect of fluid flow using the first section component and the second section component for the first stage of the drilling and completions procedure; transitioning from the first stage of the drilling and completions procedure to a second stage of the drilling and completions procedure; responsive to transitioning from the first stage of the drilling and completions procedure to the second stage of the drilling and completions procedure, identifying, using the at least one computer, a change to at least one aspect of the modeling; responsive to identifying the change to the at least one aspect of the modeling, dynamically changing at least one aspect of the first section component or the second section component; and determining, using the at least one computer, the at least one aspect of fluid flow for the second stage of the drilling and completions procedure using the dynamically changed at least one aspect of the first section component or the second section component.

DESCRIPTION OF THE FIGURES

The present application is further described in the detailed description which follows, in reference to the noted plurality of drawings by way of non-limiting examples of exemplary implementations, in which like reference numerals represent similar parts throughout the several views of the drawings.

DETAILED DESCRIPTION

Figure 1:
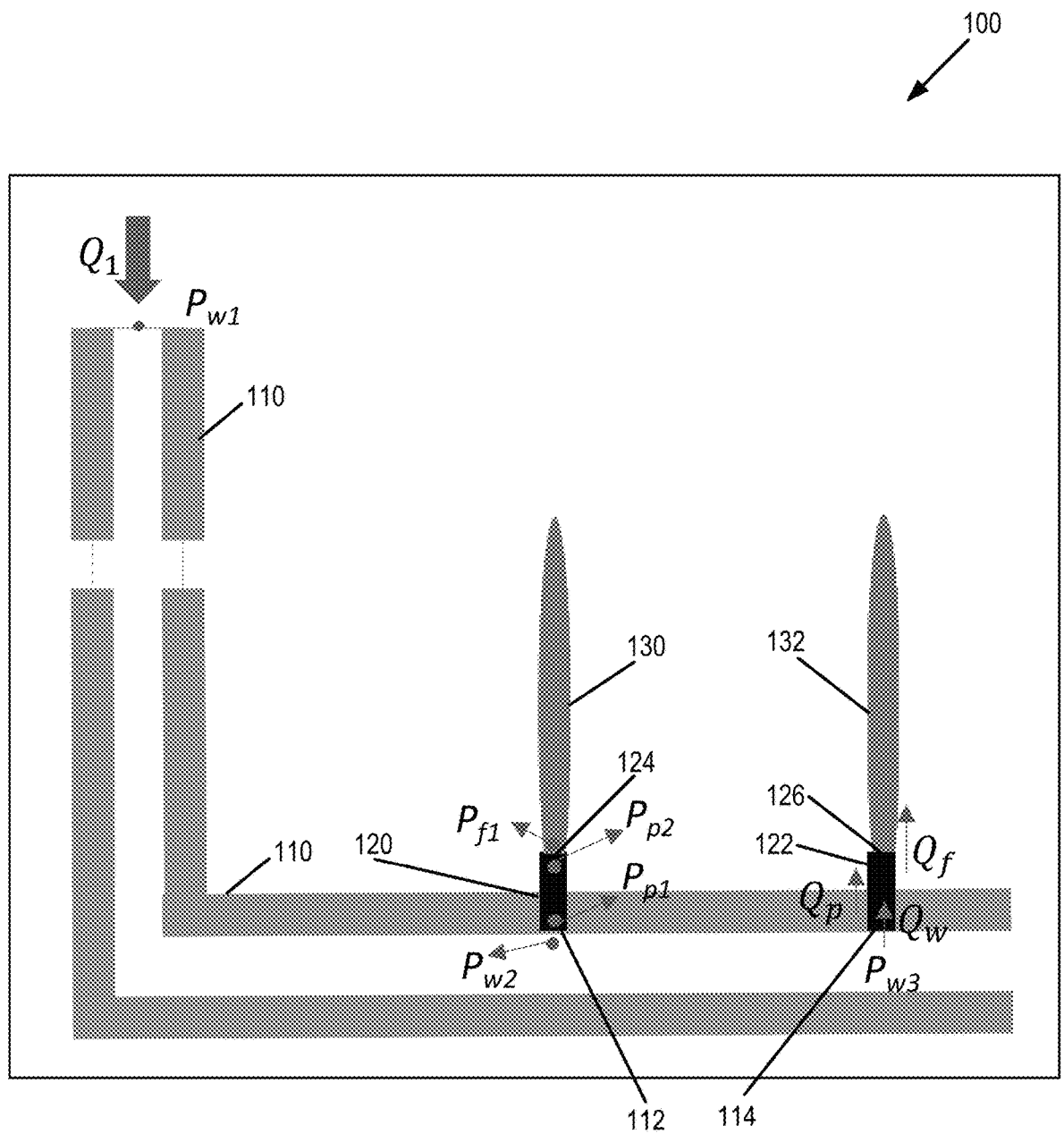
FIG. 1 illustrates a diagram of a wellbore, perforations, and fractures.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, accurate knowledge of fluid pressure in a fracture (or fracture network) is helpful for successful hydraulic fracturing treatments. However, accurately calculating the fracturing pressure is challenging due to various complexities, such as the effects of wellbore casing roughness and/or the effects of perforation friction drop.

In one implementation, a perforation component is combined with at least one, at least two, or at least three other components to delineate fluid flow in the subsurface. As one example, a wellbore component and a perforation component may be used to delineate fluid flow in the subsurface. In this example, the wellbore component may be selected to model a wellbore section of the subsurface associated with one or more wellbores, and the perforation component may be selected to model a perforation section of the subsurface associated with one or more perforations. As another example, a perforation component and a fracture component may be used to delineate fluid flow in the subsurface. In this example, the perforation component may be selected to model a perforation section of the subsurface associated with one or more perforations, and the fracture component may be selected to model a fracture section of the subsurface associated with one or more fractures.

As still another example, three separate flow components, including a wellbore component, a perforation component, and a fracture component, are used to delineate the fluid flow from the surface to the subsurface fracture. For example, each of the wellbore component, the perforation component, and the fracture component may be a separate respective component independently selected to represent different respective sections of the subsurface. Further, the wellbore component may be selected to model the wellbore section of the subsurface associated with one or more wellbores, the perforation component may be selected to model the perforation section of the subsurface associated with one or more perforations, and the fracture component may be selected to model fracture section of the subsurface associated with one or more the fractures.

As yet another example, four separate flow components, including a wellbore component, a perforation component, a fracture component, and a rock component, are used to delineate the fluid flow in the subsurface. In this regard, additional components may be added to the wellbore component/perforation component/fracture component combination. Thus, the addition of the rock component results in a wellbore component/perforation component/fracture component/rock component combination. The rock component may be selected to model a rock section of the subsurface associated with the rock in a part of the subsurface. The rock component may manifest as one or more equations indicative of the rock formation proximate to the fracture.

Further, the simulation may couple respective components at discrete points (e.g., at any one, any combination, or all of: a wellbore-perforation joint/interface; a perforation-fracture joint/interface; and/or a fracture-rock joint/interface) for continuity of at least one aspect of fluid flow. For example, the simulation may couple the respective components for continuity of any one, any combination, or all: fluid kinematics, pressure, density, flow rate, or mass. The respective components may be represented in various ways, such as one or more equations, models, etc. In this regard, any discussion regarding a respective component may include respective equations or a respective model. Likewise, any discussion regarding respective equations or a respective model may be associated with a respective component.

In particular, any combination of components, such as the wellbore component/perforation component, the perforation component/fracture component, the wellbore component/perforation component/fracture component, the wellbore component/perforation component/fracture component/rock component, with its respective governing equations, may be solved either sequentially or in combination (e.g., in a coupled matrix) in order to obtain the desired aspect(s) of fluid flow. For example, a respective equation for the wellbore component and a respective equation for the perforation component may each be solved at the wellbore-perforation interface in order to determine at least one aspect of fluid kinematics at the wellbore-perforation interface (and optionally determine, by extrapolation, the fluid kinematics away from the wellbore-perforation interface). As another example, a respective equation for the perforation component and a respective equation for the fracture component may each be solved at the perforation-fracture interface in order to determine at least one aspect of fluid kinematics at the perforation-fracture interface (and optionally determine, by extrapolation, the fluid kinematics away or remote from the perforation-fracture interface).

Further, separate from the wellbore-perforation joint/interface and the perforation-fracture joint/interface, a fracture-rock joint/interface may be used for the simulation. For example, a respective equation for the fracture component and a respective equation for the rock component may each be solved at the fracture-rock interface in order to determine at least one aspect of fluid kinematics at the fracture-rock interface (and optionally determine, by extrapolation, the fluid kinematics away from the fracture-rock interface). In this way, the wellbore component is not connected directly to the rock. Rather, intermediate components, include the perforation component and the fracture component, are between the wellbore component and the rock component.

In one implementation, any one, any combination, or all of the models (e.g., equation(s)) for the wellbore component, perforation component, fracture component or the rock component may be selected from a plurality of available components. For example, the wellbore component may be selected from a plurality of wellbore components (e.g., models or equations), the perforation component may be selected from a plurality of perforation components, and the fracture component may be selected from a plurality of fracture components. In this way, the methodology allows the selection of the governing equation of each respective component independently and couples them only at discrete interfaces or joints for continuity of fluid kinematics and properties (such as pressure, flow rate, and density).

In a specific implementation, at least one aspect of implementing the combination of components is dynamic including any one or both of: (1) selection of the respective component; or (2) operation of the respective component. For example, the geological application, such as hydraulic fracturing, water injection, cuttings reinjection, or lost returns while drilling, may be operated in stages. Transitioning from one stage to another may result in one or both of selection of a new component for the simulation and/or a change in parameters used for an existing component for the simulation.

As one example, the selection of any one, any combination, or all of the wellbore component, perforation component, fracture component or the rock component may be dynamic, and may be responsive to transition to a new stage. In particular, the initial selection of the respective model(s) may depend on a current operation (or a current stage) of the simulation. Responsive to a trigger indicative to change one or more of the models (e.g., transition to a new stage), one or more of the models are changed for the simulation. The trigger may be responsive to a change in one or more parameters of the simulation. For example, responsive to changing the fluid being pumped into the wellbore (e.g. from water (used in one pumping stage) to a proppant including sand (used in a subsequent pumping stage)), one or more of the components used in the simulation may be changed to different components (e.g., the perforation component (which does not consider erosion effects) used in the simulation may be changed to a different perforation component (which accounts for erosion effects)). Alternatively, the trigger may be responsive to determining that the simulation is unable to converge to a solution. For example, responsive to the inability to determine the fluid kinematics, a different component may be selected for any one of the components disclosed.

As another example, the selection of parameter(s) for any one, any combination, or all of the wellbore component, perforation component, fracture component or the rock component may be dynamic, and may be responsive to transition to a new stage. In particular, a first stage may have a first configuration (e.g., any one, any combination, or all of: a first number of perforations; a first number of fractures; a first geometry of perforations; a first geometry of fractures) and a second or subsequent stage may have a second configuration (e.g., any one, any combination, or all of: a second number of perforations; a second number of fractures; a second geometry of perforations; a second geometry of fractures). Transition from the first stage to the second stage triggers a change in implementation of the components (but not a change in the components themselves), such as the variables used to implement the components.

In addition, the wellbore component/perforation component/fracture component (and optionally the wellbore component/perforation component/fracture component/rock component) may be used for various applications (e.g., drilling and completions procedure) including hydraulic fracturing, water injection, cuttings reinjection and lost returns while drilling. In this regard, any discussion regarding hydraulic fracturing may likewise be applied to any one of water injection, cuttings reinjection or lost returns while drilling. Further, the present disclosure is not limited to any particular type of fracturing. As one example, the present disclosure may be directed to modeling fracture growth, such as the modeling of fracture growth in ductile rock layers.

Referring to the figures, FIG. 1 illustrates a diagram 100 of a wellbore 110, perforations 120, 122, and fractures 130, 132. As shown, an entry into wellbore 110 includes flow rate (e.g., mass flow rate) of fluid $Q_1$ and pressure $P_{w1}$. Wellbore 110 includes a casing so that there are a finite number of perforations, shown as perforation 120, 122. Alternatively, wellbore 110 may not include a casing. Further, there is a first wellbore-perforation interface 112 between wellbore 110 and perforation 120, and a second wellbore-perforation interface 114 between wellbore 110 and perforation 122. At the first wellbore-perforation interface 112, pressure on the wellbore side ($P_{w2}$) equals pressure on the perforation side ($P_{p1}$). Likewise, fluid flow is illustrated in FIG. 1, including fluid flow on the wellbore side into perforation 122 ($Q_w$), fluid flow through perforation 122 ($Q_p$), and fluid flow through fracture 132 ($Q_f$). Similar to pressure at the interfaces, at the second wellbore-perforation interface 114, fluid flow out of the wellbore side into the perforation equals fluid flow into the perforation side. As discussed further below, the respective components for a respective interface may be set equal to one another in order to determine the fluid flow at the respective interface.

FIG. 1 further illustrates first perforation-fracture interface 124, in which pressure on the perforation side ($P_{p2}$) equals pressure on the fracture side ($P_{f1}$), and second perforation-fracture interface 126. Further, fluid flow exiting the perforation side into second perforation-fracture interface 126 equals fluid flow on the fracture side out of second perforation-fracture interface 126.

Though FIG. 1 illustrates only one wellbore, a single wellbore or multiple wellbores are contemplated. As discussed in more detail below, a wellbore component may be selected to model the wellbore(s) as illustrated in FIG. 1, a perforation component may be selected to model the perforations as illustrated in FIG. 1, and a fracture component may be selected to model the fractures as illustrated in FIG. 1. Further, the simulation may solve for various aspects of fluid mechanics at the interfaces between components, such as at any one, any combination, or all of: the first wellbore-perforation interface 112; the second wellbore-perforation interface 114; the first perforation-fracture interface 124, or the second perforation-fracture interface 126. Further, in the event that additional components, such as a rock component are modeled, the simulation may solve for various aspects of fluid mechanics at the fracture-rock interface.

Though FIG. 1 does not illustrate fluid flow through perforation 120 and does not illustrate pressure in perforation 122, it is contemplated that the simulation may determine any aspect (e.g., pressure, velocity, density, temperature, etc.) directed to the operation of the system. For example, if the cross section corresponding to the respective component is constant (such as the cross section of the perforation), the velocity is constant in the respective component. Further, one, some, or each of the wellbores may have respective perforations through a well casing. A fracturing fluid may be pumped at high pressure through the perforations. When the pressure of the fluid exceeds the strength of the rock layer, fractures will form as the rock breaks. The fracturing fluid may be aqueous or non-aqueous, and may contain materials to hold open the fractures that form. These materials, known as proppants, may include natural or synthetic materials such as sand, gravel, ground shells, glass beads, or metal beads, among others.

Figure 2:
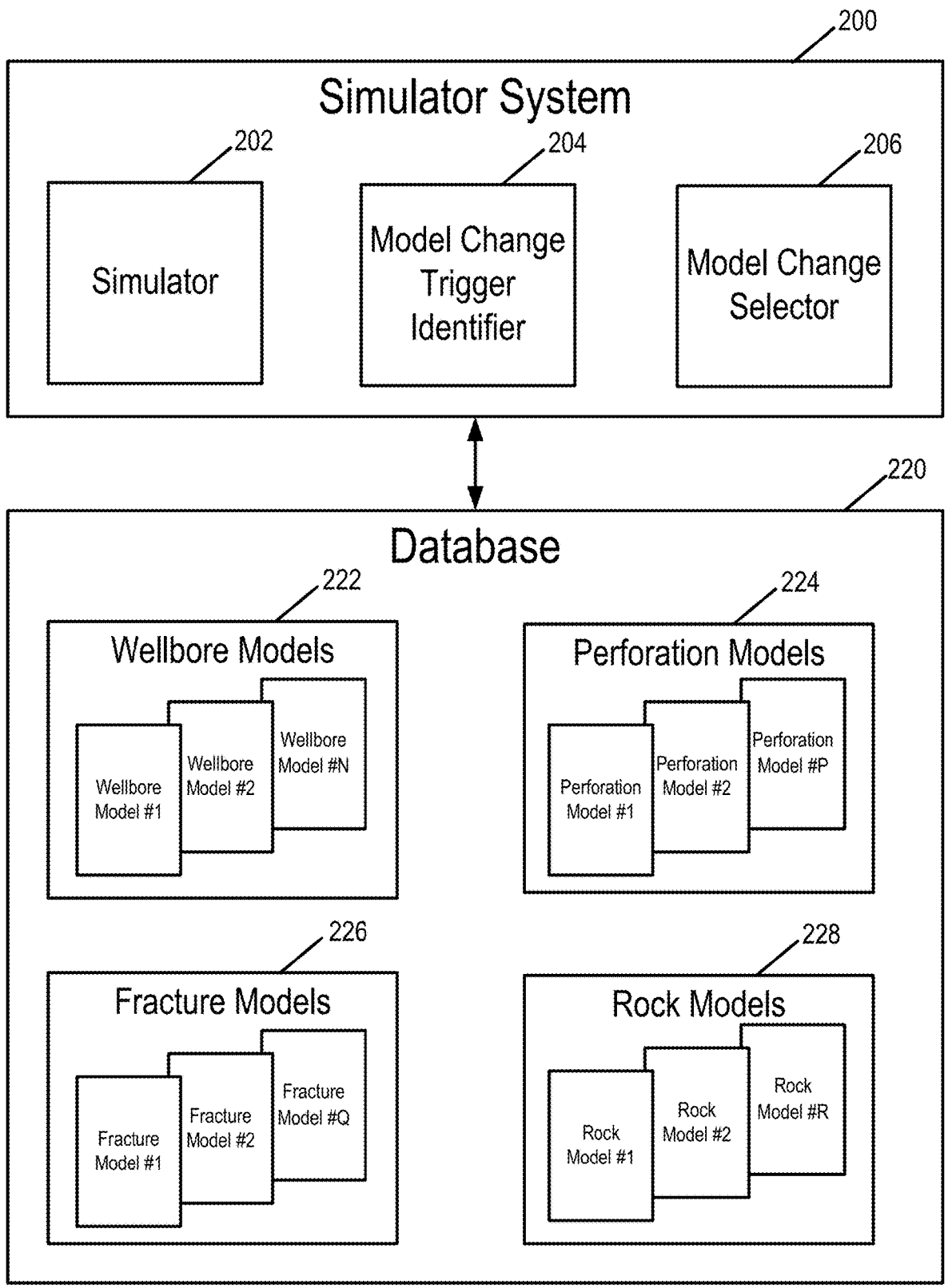
FIG. 2 is a block diagram of a simulator system and database.

FIG. 2 is a block diagram of the simulator system 200 and database 220. Though FIG. 2 illustrates database 220 as separate from the simulator system 200, database 220 may be integrated within simulator system 200. In one implementation, simulator system 200 selects independent components of the wellbore component, perforation component, and fracture component (and optionally the rock component), thereby connecting one or more aspects of the system, such as fluid flow $Q_1$ and/or wellhead pressure $P_{w1}$ to the fractures. For example, the simulator system 200 may independently select the respective components for one, any combination, or all of the wellbore, perforation, fracture, or rock. Further, one, some, or all of the selected components may be independent of one another, with the simulator solving for the various aspects of fluid mechanics at the different interfaces.

In one implementation, there are multiple components available for selection in one, some, or each of the wellbore component, perforation component, fracture component, and rock component. For example, FIG. 2 illustrates: multiple wellbore models 222, including wellbore model #1, wellbore model #2, . . . wellbore model #N (e.g., potential wellbore components); multiple perforation models 224, including perforation model #1, perforation model #2, . . . perforation model #P (e.g., potential perforation components); multiple fracture models 226, including fracture model #1, fracture model #2, . . . fracture model #Q (e.g., potential fracture components); and multiple rock models 228, including rock model #1, rock model #2, . . . rock model #R (e.g., potential rock components).

In particular, example wellbore models include, without limitation, any one, any combination, or all of: 1D laminar pipe (with or without friction); 1D turbulent pipe flow (with or without friction), 1D transition from laminar to turbulent flow (with or without friction), with compressible or incompressible fluid flow. In addition, the flow may be single phase or multi-phase. In this regard, each of the listed wellbore models may be for single phase (e.g., 1D laminar single phase) or for multi-phase (e.g., 1D laminar multi-phase). Other wellbore models are contemplated. Based on the current stage of the simulation, model selector 208 may select one of the wellbore models 222 for use in the simulation.

Example perforation models include, without limitation, any one, any combination, or all of: no-loss perforation (e.g., pressure p1 at a first part of the perforation channel overlaps with pressure p2 at a second part of the perforation channel); Circular Poiseuille flow (with or without friction); turbulent pipe flow (with or without friction); or empirical relationship. The simulator system may select the no-loss perforation model responsive to determining that the system is for open hole operations; however, selection of the no-loss perforation model is not limited solely to open hole operations. Again, based on the current stage of the simulation, model selector 208 may select one of the perforation models 224 for use in the simulation.

As discussed above, different wellbores are contemplated, including a wellbore with a casing and a wellbore without a casing. In the instance of the wellbore with a casing, a discrete number of perforations (e.g., holes in the casing) may be modeled. In the instance of the wellbore without a casing, perforations through the wellbore may likewise be modeled. In such an instance, the fluid may apply pressure through the entire wellbore, with perforations being modeled along the entire wellbore. In this regard, the wellbore-perforation interface is distributed throughout the entire wellbore (e.g., mapped to a grid of discrete points on the surface of the wellbore). Further, a no-loss perforation model may be used in such a no-casing scenario.

Example fracture models include, without limitation, any one, any combination, or all of: Plane Poiseuille flow; non-linear Darcy flow; linear Darcy flow; a combination of Poiseuille and Darcy flow; or Plane Poiseuille with proppant concentration and settlement. The fracture model may be directed to fluid leak-off from the fracture. Based on the current stage of the simulation, model selector 208 may select one of the fracture models 226 for use in the simulation.

Example rock models include, without limitation, any one or both of: poro-elastic; or elastic; elastic-plastic rock model. Finally, based on the current stage of the simulation, model selector 208 may select one of the rock models 228 for use in the simulation.

Figure 4:
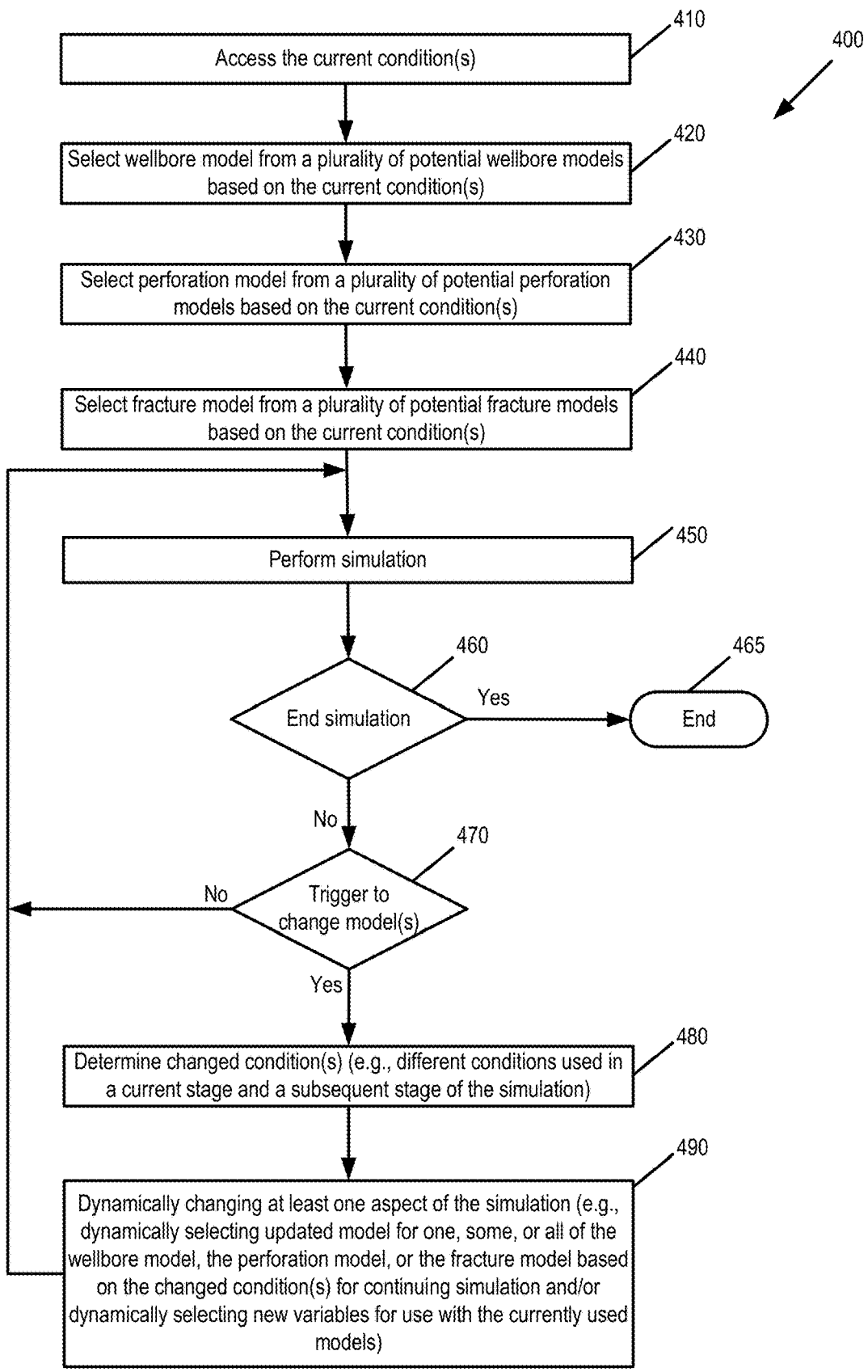
FIG. 4 is a flow diagram for dynamically updating any one, any combination, or all of a wellbore component, a perforation component, or a fracture component for a simulation.

Referring back to FIG. 2, simulator system 200 includes simulator 202, model change trigger identifier 204, and model change selector 206. As discussed above, model change selector 206 is configured to determine a change to at least one aspect of the models (e.g., select, from the wellbore models 222, perforation models 224, fracture models 226, and rock models 228, the respective models for simulator 202 to use in a subsequent stage of the simulation; select one or more new variables for simulator 202 to use in the subsequent stage of the simulation). Simulator 202 is configured to simulate the fluid flow, including determining one or more aspects of the fluid flow. Model change trigger identifier 204, discussed further with regard to FIG. 4, is configured to identify a trigger which results in a change to a respective model (e.g., new model being selected for the simulation and/or new variables for the currently used models). Further, model change selector 206 may tailor the selection of the different components for the simulation based on one or more criteria, including any one, or both of the following: current circumstances of the simulation (e.g., the component is tailored to the current fluid used and/or to current configuration, etc.); or desired complexity (e.g., model change selector 206 tailors the selection based on computational capability of the system).

In one implementation, simulator 202 is configured to solve for one or more variables of interest. In particular, simulator 202, using the respective components in combination, may solve for the variables of interest, such as by using respective governing laws in a Finite Element or Finite Volume numerical scheme. For example, Finite Volume is configured to preserve local conservation.

In particular, simulator 202 may focus on solving for at least one aspect of fluid flow at the respective interfaces, such as at any one, any combination or all of the wellbore-perforation interface, the perforation-fracture interface, or the fracture-rock interface.

For example, in one implementation of the numerical simulation, the wellbore component, perforation component, and fracture component are coupled only at the joints or interfaces such that: $P_{w2}=P_{p1}$, $P_{p2}=P_{f1}$, $Q_w=Q_p$, $Q_p=Q_f$, as illustrated in FIG. 1. In such an implementation whereby the separate components (such as the interfaces between the components) are used in the simulation, the wellbore pressure is not directly tied to the rock. Instead, the wellbore pressure is connected to a perforation component, which in turn is connected to the fracture inlet. Further, multiple perforations belonging to one cluster or one stage may be represented as a unified perforation that carry the combined mass flow rate. Finally, various special cases may be implemented. For example, special cases of perforation may be implemented, such as a no-casing wellbore, orifice-based empirical relationship, erosion and limited entry perforation as part of perforation governing laws.

Further, as discussed above, geological applications may be executed in stages. For example, fracking may be executed in a plurality of stages (such as at least 10 stages, at least 20 stages, at least 30 stages, at least 50 stages, at least 100 stages, etc.). A well may first be drilled vertically, and then horizontally. The absolute end of the horizontally drilled section may be termed the "toe" and the bend from vertical to horizontal may be termed the "heel". The distance between the toe and the heel may be at least several kilometers, such as, for example, 10 kilometers (km). Different sections from the heel to the toe may be processed in stages. In the given example of the 10 km horizontal section, a first section of 9-10 km from the heel may be processed (i.e., a plug may be inserted 1 km backward from the toe). In the first section stage for processing the first section, one or more perforations and one or more fractures may be created, and fluid may be pumped into the first section. After completing the first section stage (thereby completely closing the first stage), a second section of 8-9 km from the heel may be processed (i.e., a plug may be inserted 2 km backward from the toe). Again, in the second section stage, one or more perforations and one or more fractures may be created, and fluid may be pumped into the second section. This process may continue for the different sections.

Further, the parameters for the respective sections may be the same or may be different. For example, any one, any combination, or all of the number of perforations/fractures, the placement of the perforations/fractures (e.g., whether closer or further away from an existing fracture), the type of fluid pumped, the rate at which the fluid is pumped, etc., may change for the different stages. The parameters from a respective stage may thus change the selection of the component(s) (e.g., change from a first perforation component to a second perforation component) for the respective stage and/or the values for the component(s) (e.g., the perforation component used in the simulation remains constant from one stage to the next; however, the variables used to implement the perforation component changes, such as the number of perforation and/or the geometry of the perforations). In particular, responsive to a section's proximity to an existing fracture, the simulation for simulating the respective stage for the section may select a different component for the fracture component. In this regard, when transitioning from one stage to another, the simulation may change the operating parameters. Responsive to the change in the operating parameter(s), the simulation may thus change one or both of: the component(s) used in the simulation; or the parameters used by the component(s) in the simulation.

In addition, the simulation may be used in various contents. For example, in one implementation, the simulation may be performed in conjunction with a real-time application. In particular, the simulation for a respective stage in the geological application may be performed after or along with the real-time execution of the respective stage. The results of the simulation may be compared with the results of the real-time execution, with the comparison determining whether to maintain or change parameters in subsequent stages. Alternatively, simulations may be used to analyze a plurality of different scenarios for the geological application, with the simulation determining which of the different scenarios is deemed the best for the geological application.

Wellbore Models

As discussed above, various wellbore models are contemplated. One example wellbore model is a 1D wellbore model based on mass conservation with Darcy-Weisbach equation.

1D Wellbore Model: Mass Conservation with Darcy-Weisbach Equation

Beginning with Bernoulli's equation incorporating empirical Darcy-Weisbach equation, assume flow velocity is constant ($v_a = v_b = v$) and uniform cylindrical pipe, leading to:

$$\frac{P_a}{\rho g} + \frac{v_a^2}{2g} + Z_a = \frac{P_b}{\rho g} + \frac{v_b^2}{2g} + Z_b + \frac{f_D l v^2}{2gD} \quad \text{Eq. (1)}$$

$$\rightarrow \Delta P_w = -\rho g \Delta Z - \frac{f_D l \rho}{2D} v^2 \quad \text{Eq. (2)}$$

where: $P_a$, $P_b$ is pressure at the nodes; $v_a$, $v_b$ is velocity at the nodes; v is mean velocity; $Z_a$, $Z_b$ is elevation at the nodes; ρ is density of the fluid; g is acceleration due to gravity; $f_D$ is a Darcy friction factor; l is the length of the pipe; D is the diameter of the pipe; and $\Delta P_w$ is the pressure drop in wellbore.

Eq. (2) provides a correlation between the pressure drop $\Delta P_w$ due to friction along a given length of cylindrical pipe of constant cross section and the fluid average velocity v for an incompressible, Newtonian fluid. It is applicable to all types of fully developed internal flows including laminar or turbulent flows, smooth or rough pipe surface, horizontal or inclined pipes. It is noted that the pressure drop is zero in the absence of friction.

The Darcy friction factor $f_D$ depends on the characteristics of the pipe (diameter D and roughness height ϵ), the characteristics of fluid (density ρ and viscosity μ) and the velocity of the fluid flow v. One or more fluid regimes may be considered. For example, below are considered two broad fluid regimes defined by Reynolds number Re=ρ/μ vD: (1) Laminar flow: The Hagen-Poiseuille flow; and (2) Transitional flow/Turbulent flow.

In the first case (i.e., Laminar flow: The Hagen-Poiseuille flow), the Darcy friction factor $f_D$ is a function of the Reynolds number and may be independent of the roughness of the pipe.

$$f_D = \frac{64}{Re} \quad \text{Eq. (3)}$$

Inserting the definition of $f_D$ into Eq. (2), one obtains:

$$\Delta P_w = -\rho g \Delta Z - \frac{32 \mu l}{D^2} v. \quad \text{Eq. (4)}$$

The above equation is also known as the Hagen-Poiseuille equation, which demonstrates that the pressure drop is proportional to the flow velocity ($\Delta P \propto v$). The Hagen-Poiseuille flow is a special case of the Navier-Stokes momentum equations with no slip boundary conditions at the pipe wall under cylindrical coordinates, assuming the flow is steady, axisymmetric, fully developed and the radial and swirl components of the fluid velocity are zero.

In the second case (i.e., Transitional flow/Turbulent flow), as the Reynolds number increases, the flow transitions from laminar flow to turbulent flow, which is a complex mechanism that may be dominated by chaotic changes in pressure and flow velocity. The Darcy friction factor depends on the Reynolds number and the relative roughness ϵ/D, which is the ratio of the mean height of roughness of the pipe to the pipe diameter. Its definition may be based on experiments and the empirical or semi-empirical correlations developed for various situations, such as: (a) smooth pipe; (b) rough pipe; and (c) moody diagrams. Further, the change in pressure may be proportional to mean velocity squared ($\Delta P \propto v^2$).

(a) Smooth Pipe

When the pipe surface is smooth, the friction factor depends on Reynolds number only. Selective equations include:

$$\frac{1}{\sqrt{f_D}} = 2.0 \log(Re\sqrt{f_D}) - 0.8 \text{ (Prandtl equation, implicit)}$$

$$f_D = \frac{0.3164}{Re^{0.25}} \text{ (Blasius, explicit)}$$

$$f_D = 8\left[\left(\frac{8}{Re}\right)^{12} + \frac{1}{(A+B)^{1.5}}\right]^{\frac{1}{12}}$$

(Churchill's formula, explicit)

where

-continued $$\begin{cases} A = \left[-2.457 \ln\left(\left(\frac{7}{Re}\right)^{0.9} + 0.27\right)\right] \\ B = \left(\frac{37350}{Re}\right)^{16} \end{cases}.$$

(b) Rough Pipe

When the roughness height E of the pipe surface is significant, the Darcy friction factor depends on both Reynolds number and relative roughness, as illustrated in the following:

$$\frac{1}{\sqrt{f_D}} = 1.14 - 2.0 \log\left(\frac{\epsilon}{D} + \frac{9.35}{Re\sqrt{f_D}}\right)$$

(Colebrook-White equation, implicit).

(c) Moody Diagrams

The Moody chart presents the Darcy friction factor for circular pipe flow as a function of the Reynolds number and relative roughness D over a wide range.

Incorporating mass conservation with Darcy-Weisbach laws, one may write the governing equation for 1D pipe flow in the case of laminar regime as follows:

$$\frac{d}{dt}(\rho A) + \frac{d}{dl}\left(-k_w \rho \frac{d}{dl}(P_w + \rho g Z)\right) = Q_{wi} \quad (5)$$

where $$k_w = \frac{\pi D^4}{128\mu} \quad \left[\text{unit: } \frac{m^4}{Pa \cdot s}\right]$$

is the coefficient of wellbore conductivity, A is the cross sectional area and l represents the parametric coordinate defined on 1D wellbore line. At flux boundary conditions, flow rate $Q_1$ is prescribed at the wellbore head, and flow rate going from wellbore to the $i^{th}$ perforation cluster $Q_{wi}$ is treated as source terms at the position of the perforation cluster.

Perforation Models

Various perforation models are contemplated. As one example, the perforation model may indicate a perforation pressure loss $\Delta P_p$. In particular, when an adequate number of suitable size perforations are available, the perforation pressure drop may be assumed to be a constant or have a negligible influence during the entire treatment. However, determining the pressure loss across the perforation is central to successful design and execution of hydraulic fracturing treatments under following situations: (1) a limited number of perforations exist as the connections between the wellbore and the rock formation; (2) considerable variation of the formation in-situ stress at different perforation clusters; and (3) high proppant concentration is pumped at high speed.

Three models for perforation loss are discussed below with the assumption that multiple perforations belonging to one cluster or one stage may be represented as a unified perforation that carry the combined mass flow rate.

(1) Perforation/pipe flow without friction and without pressure loss:

$\Delta P_p = 0 (P_{p1} = P_{p2})$.

(2) Circular Poiseuille flow/Turbulent pipe flow:

One may refer to Eq. (5) defined above in the 1D pipe model section, with the substitution of characteristics of perforation.

(3) Orifice flow with/without erosion effects.

The classical sharp-edged orifice equation, derived from Bernoulli's principle, is an alternative for predication of pressure loss across the perforation clusters:

$$\begin{cases} \Delta P_{pi} = \frac{8}{\rho N^2 \pi^2 C_{Di}^2 D_i^4}(Q_{pi})^2 \\ Q_1 = \sum_{i=1}^{m} Q_{pi} \end{cases},$$

measured in SI units, where N, $\Delta P_{pi}$, $Q_{pi}$, $D_i$ and $C_{Di}$ are the number of the perforations per cluster, the perforation pressure drop, the mass injection rate, the perforation diameter and the dimensionless discharge coefficient at the $i^{th}$ perforation cluster, respectively. Q is the total mass rate pumped to the wellbore and m is the total number of active perforation clusters.

In this model, the fluid flow rate $Q_{pi}$ through a perforation cluster is assumed to be proportional to the square root of the pressure drop across the perforation cluster $\sqrt{\Delta P_{pi}}$. One numerical difficulty with this model is that the derivative of the flow with respect to the pressure drop goes to infinity while the pressure drop tends to zero. This singularity can be eliminated by introducing the following linear pressure drop law:

$$\Delta P_{pi} = \frac{\mu}{0.02 \rho N \pi D^3} Q_{pi}$$

with the substitution of the empirical relationship between the discharge coefficient $C_{Di}$ and the square root of the Reynold number $C_{Di} = 0.2\sqrt{Re}$ for small Reynolds number. The transition from the linear pressure loss region to conventional square root model is smooth.

Figure 5A:
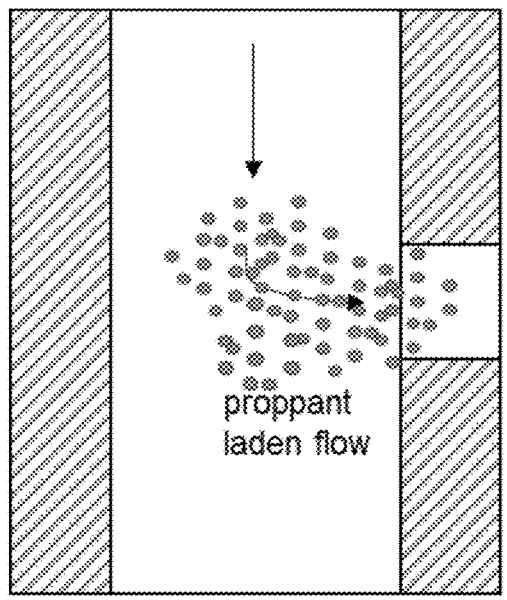
FIGS. 5A-B are a schematic view of perforation erosion, showing initial perforation erosion (FIG. 5A) and perforation erosion in progress (FIG. 5B).
Figure 5B:
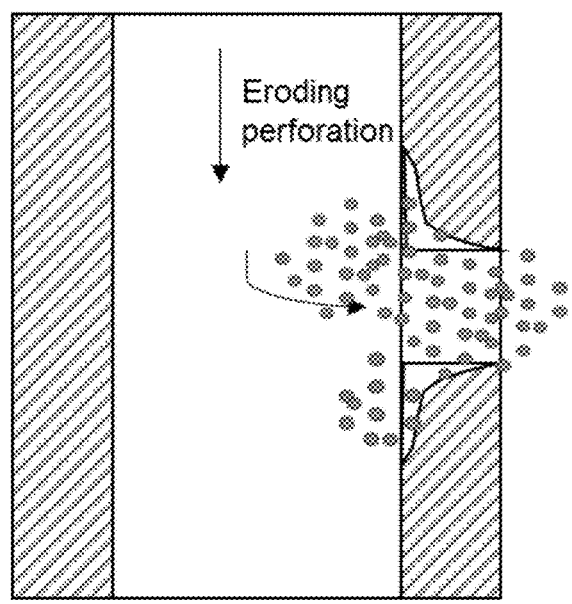

Among all aforementioned parameters, $C_D$ and D increase over treatment time due to erosion effects as the proppants pass through the perforation. FIGS. 5A-B is a schematic view of perforation erosion, showing initial perforation erosion (FIG. 5A) and perforation erosion in progress (FIG. 5B), in the proppant erodes edges in the perforation.

To account for the effect of erosion, the perforation-erosion model that describes the rate changes of $C_D$ and D as functions of proppant concentration and velocity may be used, as shown in the following:

$$\begin{cases} \frac{dD}{dt} = \alpha C v^2 \\ \frac{dC_D}{dt} = \beta C v^2 \left(1 - \frac{C_D}{C_D^{max}}\right) \end{cases},$$

where C is proppant concentration, v is the mean velocity of the fracturing fluid at the perforation, and $C_D^{max}$ is the maximum discharge coefficient during a perforation erosion. $\alpha$ and $\beta$ are two independent erosion parameters that represent the influence of the specific intrinsic mechanical properties of the proppant and casing. Both parameters may be empirically fitted to match the perforation-erosion behavior. Thus, perforation model (3) may be used when pumping in sand due to effects of erosion. Further, perforation model (3) may be used for multiple perforations.

The perforation pressure drop $\Delta P_p$, as an intermediate component, connects the wellbore fluid pressure $P_{w2}$ and the fracture fluid flow inlet pressure $P_{f1}$ with the following assumptions:

$$P_{w2}=P_{p1}, P_{p2}=P_{f1} \rightarrow \Delta P_p = P_{p1}-P_{p2}=P_{w2}-P_{f1}.$$

The mass injection rate $Q_{pi}$ at the $i^{th}$ perforation cluster is then determined by solving the wellbore-fracture model. In return, it will be incorporated to the wellbore-fracture model though flux boundary conditions at the outlet of the wellbore (e.g., the wellbore/perforation interface) and the inlet of the hydraulic fracture (e.g., the perforation/fracture interface) at the $i^{th}$ perforation cluster, respectively. The wellbore-perforation-fracture model may be fully coupled through continuity of pressure and fluid flux.

$$Q_{wi}=Q_{pi}, Q_{pi}=Q_{fi}$$

Fracture Models

Various fracture models are contemplated. As one example, the fracture model may model the fluid flow inside the fracture, such as using a lubrication equation. In particular, the fracture fluid flow may be assumed to be incompressible, plane Poiseuille flow between two smooth plates separated by an aperture w, with no-slip boundary conditions at plate-fluid interfaces and zero pressure is prescribed at the fracture front. The following Mass conservation is used:

$$(\rho w)_{,t} + \nabla_s \cdot (\rho q_f) = Q_{fi} + \rho v_{leak}$$

where S is the fracture face and $q_f$ [unit: m²/s] is the volumetric flow rate per unit width of the fracture inlet which is always parallel to the fracture face. Again, at the inlet of the fracture, fluid flow rate $Q_{fi}$ is equal to the flow rate through the $i^{th}$ perforation $Q_{pi}$.

Fluid leak-off accounting for the vertical fluid flow to the rock formation may be added to the above equation as a separate term according to the following:

$$v_{leak} = \frac{2c_l}{\sqrt{t-t_0}} + 2s_p \delta(t-t_0),$$

(Carter's leak-off model)

where $c_l$ is the leak-off coefficient, $s_p$ is the spurt loss coefficient and $t_0$ is the time when the point on the fracture face is first flooded by the fluid. Thus, the Carter's leak-off model may be used to account for fluid leaking from the fracture into the rock. Many alternative models may be used to represent the leak-off, for instance the Darcy leak-off between fracture and rock $$v_{leak} = \frac{k}{\mu}(P_f - P_{rock}),$$

(Darcy leak-off model).

Various flows are contemplated including Poiseuille flow, Darcy flow and Nonlinear Darcy flow.

Poiseuille flow—"cubic law"

$$q_f = -\frac{w^3}{12\mu} \nabla_s P_f,$$

$$\left(\text{cubic law: } k = \frac{w^3}{12}\right).$$

Darcy flow $$q_f = -w\frac{k}{\mu}\nabla_s P_f$$

where k is the permeability.

Thus, in one instance, the fluid, which includes sand, may be pumped into the wellbore, traverse the perforation, and to the fracture. In one instance, the liquid in the fluid returns but the sand remains in the fracture. In this instance, hydrocarbons may be produced through the fracture, with the fracture opening still including sand. Depending on the circumstances (whether the rock remains intact or is disintegrating), different fracture models may be selected. For example, if the rock is not disintegrating, the fracture model may comprise linear Darcy flow. If the rock is disintegrating, the flow may not be uniform, thereby resulting in the selected fracture model to be non-linear Darcy flow. In this regard, the model selector 208 may account for such circumstances (e.g., whether the rock remains intact or is disintegrating) when selecting the fracture model (e.g., whether to select a model based on linear Darcy flow or on non-linear Darcy flow).

Rock Models

The pressure of the fluid in the fracture is applied onto the rock surface. In that regard, the rock model may vary based on the type of rock, such as whether the rock can absorb the fluid or cannot absorb the fluid. In the instance where the rock can absorb the fluid (e.g., poro-elastic rock), the pressure of the fluid can apply force onto the rock, and the fluid itself can seep into the rock (e.g., there may be fluid transfer from the fracture into the rock). In that regard, the rock model for the poro-elastic rock may account for these properties. Conversely, if the rock does not absorb the fluid, the fluid applies a force on the rock without a fluid transfer into the rock. Again, the rock model may account for these properties.

Figure 3:
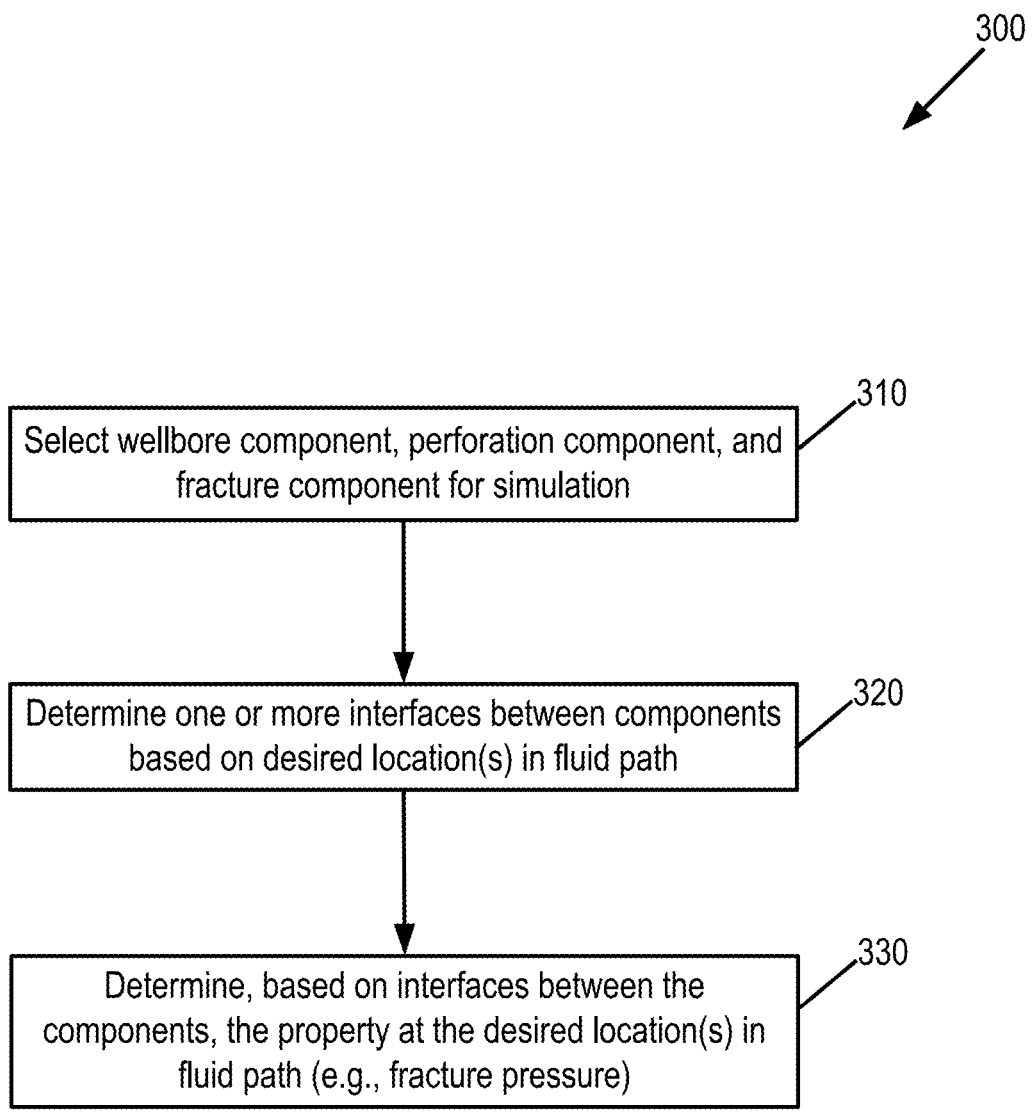
FIG. 3 is a flow diagram for using a wellbore component, a perforation component, and a fracture component for simulating fluid flow.

FIG. 3 is a flow diagram 300 for using a wellbore component, a perforation component and a fracture component for simulating fluid flow. At 310, the wellbore component, the perforation component, and the fracture component are selected for simulation. As discussed above, the selection of one, some or each of the components may be from a plurality of respective available components. Further, optionally, a rock component may be selected. At 320, the simulator may determine one or more interfaces between the components based on the desired location(s) in the fluid path. As one example, the simulator may determine which locations in the fluid path to determine the property(ies), such as pressure, velocity, etc., of the fluid flow. The location may be in any one, any combination, or all of: within the wellbore; at the wellbore-perforation interface; within the perforation; at the perforation-fracture interface; within the fracture; at the fracture-rock interface; or within the rock.

At 330, the simulator may determine, based on the interfaces between the components, the property(ies) of the fluid flow. As one example, the pressure may be sought along any point in the path of the fluid flow. As such, the simulator may first solve for the pressure at one or more of the interfaces and extrapolate to different points in the path. In this example, the simulator may seek to solve for pressure in the wellbore or in the perforation. As such, the simulator may find the pressure at the wellbore-perforation interface by setting the equation for the wellbore (as indicated by the selected wellbore component) and the equation for the perforation (as indicated by the selected perforation component) equal to one another at the wellbore-perforation interface in order to solve for the pressure at the wellbore-perforation interface. Thereafter, the pressure may be extrapolated to other parts in the path. Likewise, the simulator may find the pressure at the perforation-fracture interface by setting the equation for the perforation (as indicated by the selected perforation component) and the equation for the fracture (as indicated by the selected fracture component) equal to one another at the perforation-fracture interface in order to solve for the pressure at the perforation-fracture interface. Thus, the simulator, using the governing equations in the respective models, may solve or the desired aspect of fluid flow either sequentially or in combination.

FIG. 4 is a flow diagram 400 for dynamically updating any one, any combination, or all of the wellbore component, the perforation component or the fracture component for the simulation. At 410, one or more current conditions for the simulation are accessed. At 420, the wellbore model is selected from a plurality of potential wellbore models based on the one or more current conditions. At 430, the perforation model is selected from a plurality of potential perforation models based on the one or more current conditions. At 440, the fracture model is selected from a plurality of potential fracture models based on the one or more current conditions. Though FIG. 4 illustrates selecting the wellbore model, perforation model and fracture model in a specific sequence, any sequence is contemplated. At 450, the simulation is performed. At 460, it is determined whether to end the simulation. If so, flow diagram 400 proceeds to end at 465.

At 470, it is determined whether there has been a trigger to change one or more of the models. If not, flow diagram 400 loops back to 450 to continue performing the simulation. Various triggers are contemplated. As one example, a trigger may comprise transitioning from a current stage of the simulation to a subsequent stage of the simulation. As another example, a trigger to change one or more of the models comprises changing the fluid pumped into the wellbore component (e.g., changing from pumping water to pumping a proppant with sand). As still another example, changing the flow rate of the pumping fluid may trigger a change of one or more of the models.

Responsive to identifying a trigger, at 480, one or more changed conditions for the simulation are determined. For example, the type of fluid (e.g., with sand) may be identified as one of the changed conditions at the new stage of the modeling. At 490, at least one aspect of the simulation may be dynamically updated. As discussed above, in one implementation, dynamic updating includes dynamically selecting an updated model (which may serve as a replacement component for the purposes of modeling) for one, some, or all of the wellbore model, the perforation model, or the fracture model based on the changed condition(s) in order to continue the simulation at 450. For example, the current stage perforation model used in the current stage of the simulation may be changed to an updated perforation model (e.g., a subsequent stage perforation model for the simulation in the subsequent stage) selected to account for potential erosion due to the change in fluid to a proppant with sand.

As another example, the current stage wellbore model and/or the current stage fracture model may be dynamically changed to a subsequent stage wellbore model and/or a subsequent stage fracture model, respectively, for simulation in the subsequent stage. In this way, any one of the wellbore model, the perforation model, or the fracture model may be switched during the simulation between any of the plurality of the respective potential models. In another implementation, responsive to identifying the change condition(s), the models may not change (e.g., the same wellbore model, the perforation model, and the fracture model are used in the subsequent stage); however, variables used for the models may change (e.g., the number of perforations used for the perforation model).

Figure 6:
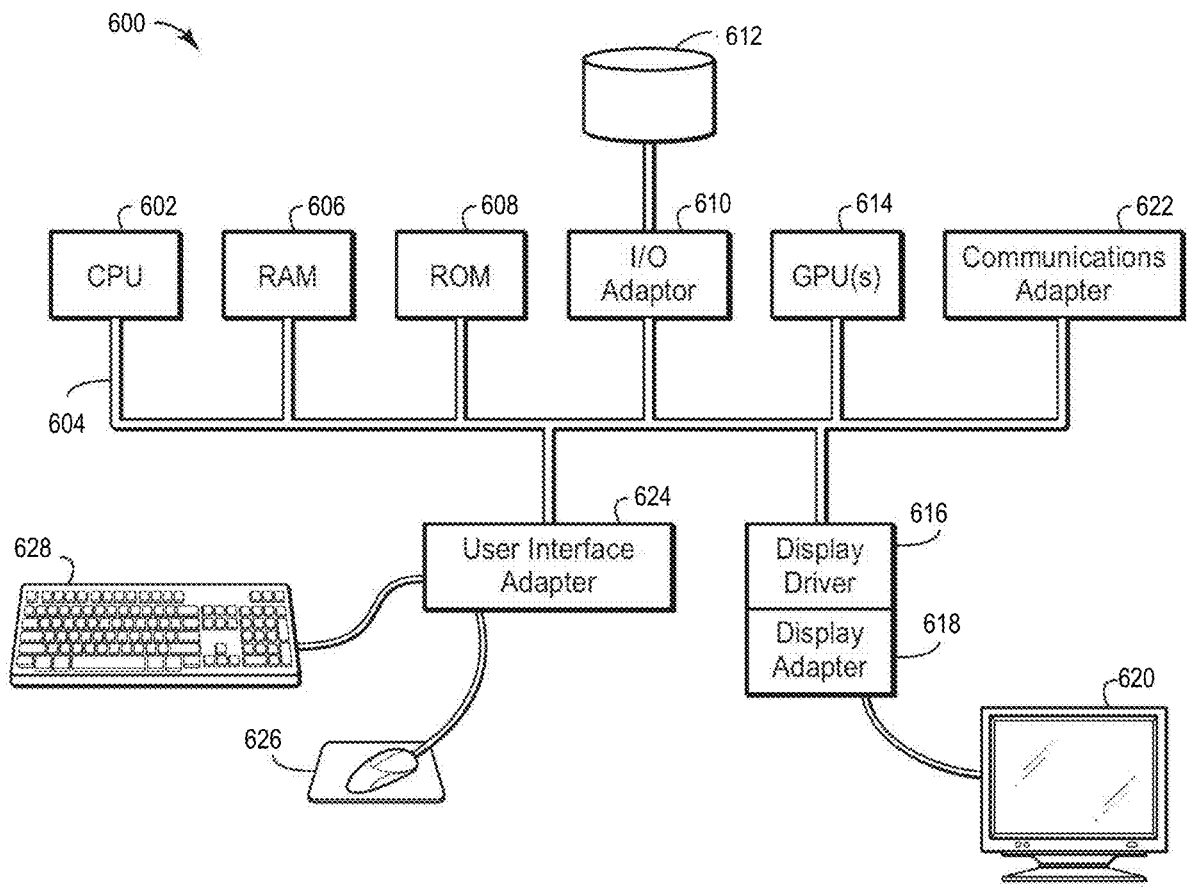
FIG. 6 is a diagram of an exemplary computer system that may be utilized to implement the methods described herein.

In all practical applications, the present technological advancement must be used in conjunction with a computer, programmed in accordance with the disclosures herein. For example, FIG. 6 is a diagram of an exemplary computer system 600 that may be utilized to implement methods described herein. A central processing unit (CPU) 602 is coupled to system bus 604. The CPU 602 may be any general-purpose CPU, although other types of architectures of CPU 602 (or other components of exemplary computer system 600) may be used as long as CPU 602 (and other components of computer system 600) supports the operations as described herein. Those of ordinary skill in the art will appreciate that, while only a single CPU 602 is shown in FIG. 6, additional CPUs may be present. Moreover, the computer system 600 may comprise a networked, multi-processor computer system that may include a hybrid parallel CPU/GPU system. The CPU 602 may execute the various logical instructions according to various teachings disclosed herein. For example, the CPU 602 may execute machine-level instructions for performing processing according to the operational flow described.

The computer system 600 may also include computer components such as non-transitory, computer-readable media. Examples of computer-readable media include a random access memory (RAM) 606, which may be SRAM, DRAM, SDRAM, or the like. The computer system 600 may also include additional non-transitory, computer-readable media such as a read-only memory (ROM) 608, which may be PROM, EPROM, EEPROM, or the like. RAM 606 and ROM 608 hold user and system data and programs, as is known in the art. The computer system 600 may also include an input/output (I/O) adapter 610, a graphics processing unit (GPU) 614, a communications adapter 622, a user interface adapter 624, a display driver 616, and a display adapter 618.

The I/O adapter 610 may connect additional non-transitory, computer-readable media such as storage device(s) 612, including, for example, a hard drive, a compact disc (CD) drive, a floppy disk drive, a tape drive, and the like to computer system 600. The storage device(s) may be used when RAM 606 is insufficient for the memory requirements associated with storing data for operations of the present techniques. The data storage of the computer system 600 may be used for storing information and/or other data used or generated as disclosed herein. For example, storage device(s) 612 may be used to store configuration information or additional plug-ins in accordance with the present techniques. Further, user interface adapter 624 couples user input devices, such as a keyboard 628, a pointing device 626 and/or output devices to the computer system 600. The display adapter 618 is driven by the CPU 602 to control the display on a display device 620 to, for example, present information to the user such as subsurface images generated according to methods described herein.

The architecture of computer system 600 may be varied as desired. For example, any suitable processor-based device may be used, including without limitation personal computers, laptop computers, computer workstations, and multiprocessor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 600 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft, Amazon.

It is intended that the foregoing detailed description be understood as an illustration of selected forms that the invention can take and not as a definition of the invention. It is only the following claims, including all equivalents, which are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

What is claimed is:

1. A method for modeling fluid flow in a drilling and completions procedure from a surface to a subsurface fracture, the method comprising:
    modeling, using at least one computer, a perforation section of a subsurface associated with one or more perforations using a perforation component selected from a plurality of perforation components;
    modeling, using the at least one computer, at least one of a wellbore section or a fracture section using a wellbore component or a fracture component selected from a plurality of wellbore components or a plurality of perforation components, respectively, the wellbore section of the subsurface associated with one or more wellbores, the fracture section of the subsurface associated with one or more fractures; and
    determining, using the at least one computer, an interface between the perforation component and the wellbore component or the fracture component based on a location in a fluid path;
    determining, using the at least one computer, at least one aspect of fluid flow based on the determined interface between the perforation component and at least one of the wellbore component or the fracture component, wherein the perforation component and the at least one of the wellbore component or the fracture component are coupled at a discrete point for continuity of the at least one aspect of fluid flow.

2. The method of claim 1, wherein modeling includes using both the wellbore component and fracture component; and
    wherein the at least one aspect of fluid flow is determined using the wellbore component, the perforation component, and the fracture component.

3. The method of claim 2, wherein a wellbore-perforation interface comprises an interface between the wellbore section of the subsurface and the perforation section of the subsurface;
    wherein the wellbore component is independent of the perforation component;
    wherein the wellbore component and the perforation component are coupled only at the wellbore-perforation interface; and
    wherein the wellbore component and the perforation component are solved at the wellbore-perforation interface in order to determine the at least one aspect of fluid flow at the wellbore-perforation interface.

4. The method of claim 3, wherein a perforation-fracture interface comprises an interface between the perforation section of the subsurface and the fracture section of the subsurface;
    wherein the perforation component is independent of the fracture component;
    wherein the wellbore component is independent of the fracture component;
    wherein the perforation component and the fracture component are coupled only at the perforation-fracture interface; and
    wherein the perforation component and the fracture component are solved at the perforation-fracture interface in order to determine the at least one aspect of fluid flow at the perforation-fracture interface.

5. The method of claim 4, further comprising modeling a rock section of the subsurface associated with rock using a rock component;
    wherein a fracture-rock interface comprises an interface between the fracture section of the subsurface and the rock section of the subsurface;
    wherein the rock component is independent of the fracture component;
    wherein the fracture component and the rock component are coupled only at the fracture-rock interface; and
    wherein the fracture component and the rock component are solved at the fracture-rock interface in order to determine the at least one aspect of fluid flow at the fracture-rock interface.

6. The method of claim 5, wherein determining the at least one aspect of fluid flow at respective interfaces is solved sequentially.

7. The method of claim 5, wherein determining the at least one aspect of fluid flow at respective interfaces is solved together in a coupled matrix.

8. The method of claim 1, wherein the drilling and completions procedure is one of hydraulic fracturing, water injection, cuttings reinjection or lost returns.

9. The method of claim 1, wherein the at least one aspect of fluid flow comprises at least one of pressure, velocity, density, or temperature.

10. The method of claim 1, further comprising dynamically changing at least one aspect of the wellbore component, the perforation component or the fracture component based on a stage of the modeling.

11. The method of claim 10, wherein the modeling transitions from a current stage to a subsequent stage;
wherein in the current stage, a current stage wellbore model, a current stage perforation model, and a current stage fracture model are used; and
wherein responsive to transitioning from the current stage to the subsequent stage,
dynamically changing at least one of the current stage wellbore model, the current stage perforation model, or the current stage fracture model to at least one of a subsequent stage wellbore model, a subsequent stage perforation model, or a subsequent stage fracture model.

12. The method of claim 11, wherein fluid used for the fluid flow from the surface to the subsurface fracture changes from the current stage to the subsequent stage; and
wherein responsive to identifying the change in the fluid used, dynamically changing from the current stage perforation model to the subsequent stage perforation model.

13. The method of claim 11, wherein the modeling transitions from a current stage to a subsequent stage;
wherein in the current stage, a current stage wellbore model, a current stage perforation model, and a current stage fracture model are used; and
wherein responsive to transitioning from the current stage to the subsequent stage, dynamically changing variables used for at least one of the current stage wellbore model, the current stage perforation model, or the current stage fracture model.

14. A method for dynamically modeling fluid flow in a drilling and completions procedure from a surface to a subsurface fracture, the method comprising:
modeling, using at least one computer, a first section of a subsurface using a first section component selected from a plurality of components for a first stage of the drilling and completions procedure;
modeling, using the at least one computer, a second section of the subsurface using a second section component selected from a second plurality of components for the first stage of the drilling and completions procedure, wherein the first section component is independent of the second section component;
determining, using the at least one computer, at least one aspect of fluid flow using the first section component and the second section component for the first stage of the drilling and completions procedure, wherein the first section component and the second section component are coupled at a discrete point for continuity of the at least one aspect of fluid flow;
transitioning from the first stage of the drilling and completions procedure to a second stage of the drilling and completions procedure;
responsive to transitioning from the first stage of the drilling and completions procedure to the second stage of the drilling and completions procedure, identifying, using the at least one computer, a change to at least one aspect of the modeling;
responsive to identifying the change to the at least one aspect of the modeling, dynamically changing at least one aspect of the first section component or the second section component; and
determining, using the at least one computer, the at least one aspect of fluid flow for the second stage of the drilling and completions procedure using the dynamically changed at least one aspect of the first section component or the second section component.

15. The method of claim 14, wherein dynamically changing the at least one aspect of the first section component or the second section component comprises replacing at least one of the first section component or the second section component with a replacement component from the plurality of components.

16. The method of claim 14, wherein dynamically changing the at least one aspect of the first section component or the second section component comprises using different values for variables for at least one of the first section component or the second section component.

17. The method of claim 14, wherein the first section component is selected from a plurality of potential well bore components;
wherein the second section component is selected from a plurality of potential perforation components;
wherein a third section component is selected from a plurality of potential fracture components for a fracture section of the subsurface; and
wherein, responsive to identifying the change, a replacement component for a respective section component is selected from a respective plurality of potential components.

18. The method of claim 14, wherein the first section of the subsurface is associated with one or more wellbores;
wherein the first section component comprising a first wellbore component;
wherein the second section of the subsurface is associated with one or more perforations;
wherein the second section component comprising a first perforation component; and
further comprising modeling, using the at least one computer, a fracture section of the subsurface associated with one or more fractures using a first fracture component.

19. The method of claim 18, wherein the change comprises a change in fluid for the fluid flow.

20. The method of claim 19, wherein dynamically changing the at least one aspect of the first section component or the second section component comprises dynamically selecting, based on the change in the fluid, a second perforation component to replace the first perforation component.

21. The method of claim 20, wherein the change in the fluid comprises changing from water to a proppant with sand;
wherein the first perforation component does not consider erosion effects; and
wherein the second perforation component considers erosion effects.

* * * * *